United States Patent
Bennett

Patent Number: 5,845,465
Date of Patent: Dec. 8, 1998

[54] FORM-FILL-SEAL-PACKAGING MACHINE

[75] Inventor: Robert Bennett, Birmingham, England

[73] Assignee: Ishida Co., Ltd., Kyoto, Japan

[21] Appl. No.: 995,938

[22] Filed: Dec. 22, 1997

[30] Foreign Application Priority Data

Dec. 23, 1996 [GB] United Kingdom .................. 9626745

[51] Int. Cl.⁶ .............................. B65B 51/26; B65B 9/20; B65B 9/22
[52] U.S. Cl. ................................ 53/551; 53/552; 53/374.3
[58] Field of Search ............................... 53/451, 551, 552, 53/554, 374.3, 375.4, 375.9, 375.3

[56] References Cited

U.S. PATENT DOCUMENTS

| | | | |
|---|---|---|---|
| 3,296,770 | 1/1967 | Wilson | 53/552 |
| 3,415,171 | 12/1968 | Wilson | 53/551 X |
| 3,779,836 | 12/1973 | Henry et al. | 53/551 X |
| 4,084,999 | 4/1978 | Rucker | 53/551 X |
| 4,373,982 | 2/1983 | Kreager et al. | 53/552 X |
| 4,576,588 | 3/1986 | Umeda et al. | 53/551 X |
| 4,598,533 | 7/1986 | Takagaki | 53/552 |
| 5,255,495 | 10/1993 | Kovacs . | |
| 5,463,850 | 11/1995 | Fukuda | 53/551 |
| 5,743,066 | 4/1998 | Fukuda et al. | 53/551 X |

FOREIGN PATENT DOCUMENTS

| | | |
|---|---|---|
| 0521698 A2 | 6/1992 | European Pat. Off. . |
| 0611697 A2 | 2/1994 | European Pat. Off. . |
| 0 611 697 A2 | 8/1994 | European Pat. Off. . |

*Primary Examiner*—Horace M. Culver
*Attorney, Agent, or Firm*—Staas & Halsey

[57] ABSTRACT

A form-fill-seal packaging machine capable of easily performing positioning between the two side edge portions of a strip-like film to be sealed and a vertical sealing device when the position of the portions to be sealed is shifted or offset, without complicating a support mechanism of the vertical sealing device bonding the portions of the strip-like film which is made to wrap on a cylindrical chute. A forming unit (7) and a cylindrical chute (8) are attached to a support unit (18). The support unit (18) is disposed opposite to a vertical sealing device (10) by engaging it with pins (16) and an adjusting screw (17) which are protrudingly provided on frames (3) of the apparatus. When the adjusting screw (17) is rotated, the support unit (18) is transversely moved with respect to the vertical sealing device (10) as designated by arrow marks L and R via the engagement with the screw (17), by which the overlapped portion A and the vertical sealing crevice (10) can easily be brought into alignment with each other even if the position of the overlapped portion A of the film F that is formed on the peripheral face of a chute (8), is shifted or made offset.

7 Claims, 6 Drawing Sheets

FORM-FILL-SEAL-PACKAGING MACHINE

CROSS REFERENCE TO RELATED APPLICATIONS

This application is based upon and claims priority from British Patent Application 9626745.5 filed Dec. 23, 1996, the contents of which are incorporated herein by reference.

BACKGROUND OF THE INVENTION

1. Field of the Invention

The present invention relates to a form-fill-seal packaging machine for enclosing commodities in packaging bags while forming a strip-like film into the packaging bags.

2. Description of the Related Art

Generally, a form-fill-seal packaging machine for forming a strip-like film into a tube-like shape while transferring the film along a transfer path and filling commodities, includes, for example, a cylindrical chute for putting in commodities, the chute extending in the vertical direction and the forming unit having a predetermined shape, and being arranged at the upper outside portion of the chute. The strip-like film is transferred in the downward direction while being formed into a cylindrical shape by being wrapped up around the peripheral face of the chute via the forming unit. In the midst of these operations the two side edge portions of the film are made to overlap each other along the transfer direction. The overlapped portions are bonded together by being heated and pressure welded by a vertical sealing device and the obtained cylindrical film is sealed in the transverse direction by a transverse sealing device provided at the downward side of the chute whereby package bags are successively formed.

According to such a pillow-type packaging bag, there are various modes of vertical sealing such as "lap sealing" in which one of the side edge portions of the film is made to simply overlap the other one of the side edge portions. "Fin sealing" involves, as illustrated in FIG. 6, one side edge portion b of the film a is folded back on itself while the other side edge portion b is made to overlap the folded back side edge portion. The folded back edge portion may be folded in either direction, i.e., left or right. Further, the overlapped section c of both side edge portions b may be disposed at the center of the packaging bag, that is, at a central portion e in the transverse direction with respect to a chute d as illustrated in FIG. 6, or the overlapped section c' may be made offset away from the center e of the packaging bag or the chute d in either direction, i.e., left or right, as illustrated in FIG. 7. Other types of seals are also possible. For example, a pinch seal is one in which the two edge portions are folded outwardly and held face to face for sealing.

Accordingly, even in the case of the same type of sealing, such as fin sealing, when the position of the film overlapping portion is offset away from the center, the chute integral with the forming unit is interchanged. In this case, the forming unit and the chute are attached at constant reference positions in the packaging machine and therefore, the position of the film overlapping section c' after the interchange is shifted in the transverse direction from the position of the overlapped section c before the interchange by an amount of the offset. Hence, according to the conventional bag forming packaging machine a vertical sealing device f is provided as shown in FIG. 7 whose position is movable in the transverse direction as designated by an arrow mark g. When a positional shift is caused between the film overlapping section c' and the vertical sealing device f bonding the overlapped section c', the positional relationship between the two is corrected by transversely moving the above-mentioned vertical sealing device f.

Meanwhile, the vertical sealing device is supported by a L-shape arm to surround sides of the chute and an elbow portion of the arm is provided with a hinge whereby the elbow is constructed flexibly. Therefore, when the arm is integrated with a mechanism by which the vertical sealing device is moved in the transverse direction in respect of the chute, or the vertical sealing device approaches to or separates from the peripheral face of the chute, the supporting mechanism of the vertical sealing device is complicated.

SUMMARY OF THE INVENTION

Hence, it is a problem which the present invention addresses, that of providing a form-fill-seal packaging machine capable of facilitating the positioning between the film overlapping portion and the vertical sealing device, for example after interchanging the vertical sealing device, without excessively complicating the supporting mechanism of the vertical sealing device.

The present invention includes a form-fill-seal packaging machine comprising a forming unit to form an elongate film into a tubular shape around a cylindrical chute, and a sealing unit to seal longitudinal edges of the film to complete the formation of tubular film. The forming unit is mounted so as to move relative to the sealing unit in a direction orthogonal to the direction of movement of the film.

The film forming unit is provided movably in the offset direction in respect of the, usually vertical, sealing unit for bonding the longitudinal edges of the film. Therefore, it is not necessary to provide a positioning adjusting mechanism to the vertical sealing unit that is supported escapably from the film forming unit as in the conventional example whereby the supporting mechanism of the vertical sealing unit can be simplified.

Furthermore, when the positioning of a vertical sealing unit and the film forming unit is carried out, the side of the film forming unit is moved in the horizontal direction and the region of the film forming unit where the longitudinal edges of the film are brought together is brought into alignment with the vertical sealing unit whereby the confirmation of the positioning is facilitated. That is, when the tube forming units are interchanged, the center positions of the tube forming units are individually different and therefore, whether the seal portion of the vertical sealing unit is in alignment with the correct part of the film forming unit cannot be known without an actual trial operation. However, once the amount of shift is known, the two can be brought into alignment with each other simply by moving the side of the film forming means by that amount. Therefore, the vertical sealing unit and the film forming unit can easily be brought into alignment with each other without repeatedly conducting the trial operation.

It should be understood that the invention can be used with all known forms of seals including standard and reverse lap seals, standard and reverse fin seals, standard and reverse offset fin seals, and pinch seals.

BRIEF DESCRIPTION OF THE DRAWINGS

Further examples and embodiments of the present invention, as well as modifications and alternative structures and methods of use and construction will become apparent to one skilled in the art to which the present invention pertains, from a study of the following detailed description and the appended drawings, all of which form a part of this specification. In the drawings.

DETAILED DESCRIPTION OF THE PRESENTLY PREFERRED EMBODIMENTS

An explanation will now be provided of embodiments of the present invention with reference to the drawings as follows.

Figure 1:
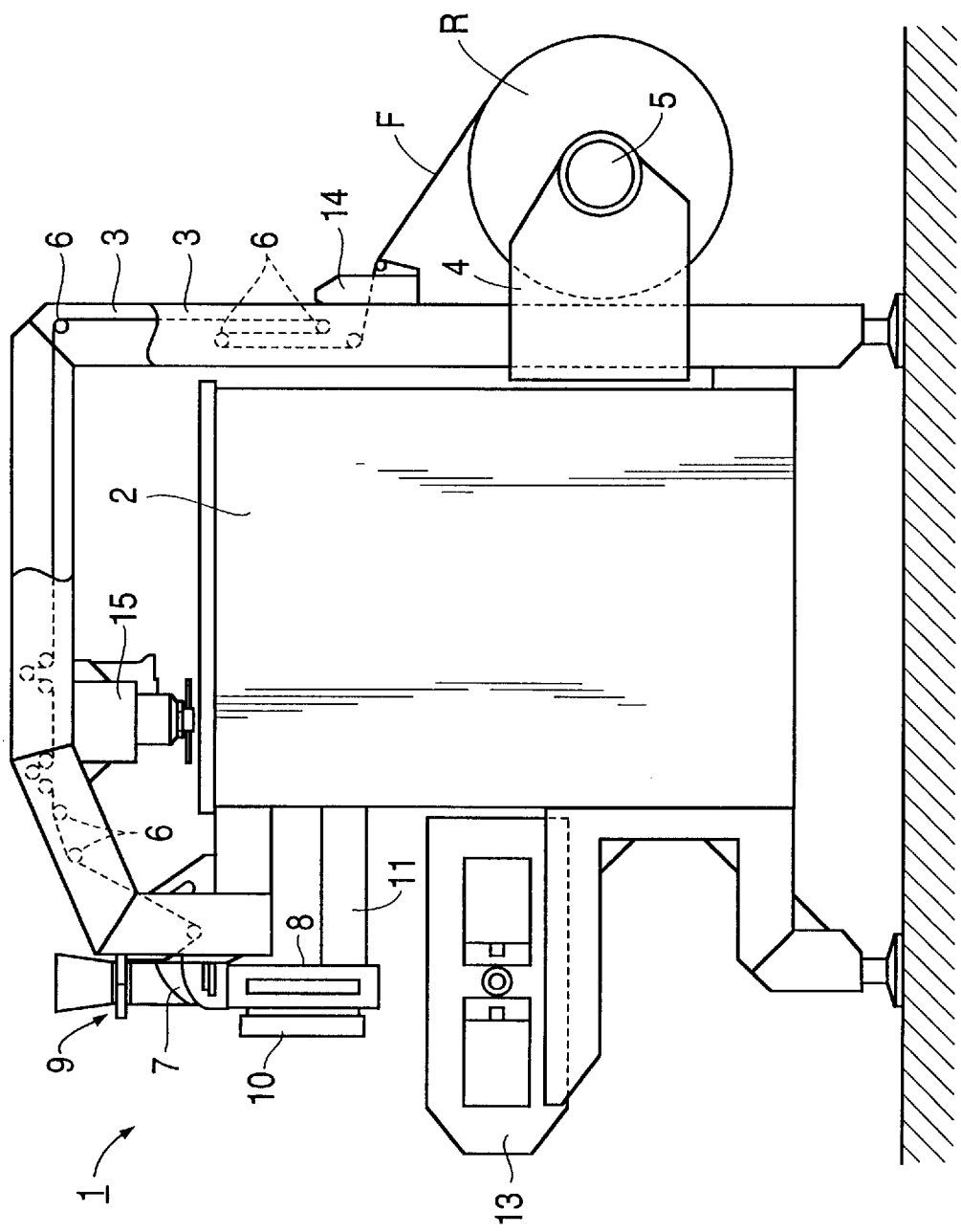
FIG. 1 is a side view showing the total constitution of a form-fill-seal packaging machine in accordance with an embodiment of the present invention.

FIG. 1 is an outline side view showing the total constitution of a bag forming packaging machine 1 in accordance with the first embodiment of the present invention. The bag forming packaging machine 1 is provided with a pair of left and right frames 3 extending from the rear side of a main body 2 to the upper side thereof and finally to the front side thereof. A strip-like film F is unreeled from a film roll R rotatably supported by the rear portions of the frame 3 via support brackets 4 and a shaft 5, which may be motor driven. The strip-like film F is transferred to the front side of the main body 1 along the frame 3 while being guided by a plurality of rollers 6 installed spanning frame 3.

A tube forming device 9 that is constituted by a forming unit 7, and a cylindrical chute 8 arranged to extend in the vertical direction for inputting commodities and the like, mentioned later, is installed at the front side of the main body 2. The strip-like film F which has been transferred along the frames 3, is curved into a cylindrical shape by being wrapped up on the peripheral face of the chute 8 by the forming unit 7, and at the same time the two side edge portions of the film F are made to overlap each other in the form of a fin seal extending in the vertical direction that is the same as the longitudinal direction of the chute 8. The film F is transferred further in the downward direction along the chute 8 under such a state.

Also, a vertical sealing device 10 is disposed at the front side of the cylindrical chute 8 opposite to the chute 8 and the two side edge portions of the film F which have been overlapped on the peripheral face of the chute 8, are press-contacted toward the side of the chute 8 by the vertical sealing device 10 and heated under this state whereby the two side edge portions are bonded together. Although not illustrated in detail, the vertical sealing device 10 is disposed opposite to the cylindrical chute 8 via a flexible L-shape supporting arm 11 provided at the front side of the main body 2. The vertical sealing device 10 is constituted such that it escapes sideways from the chute 8 by being pivoted centering on a hinge installed at an elbow portion of the supporting arm 11 in the interchanging operation of the tube forming device 9.

It will be understood that other types of seals, such as lap and pinch seals, can be formed by suitably choosing appropriate forming units.

Figure 3:
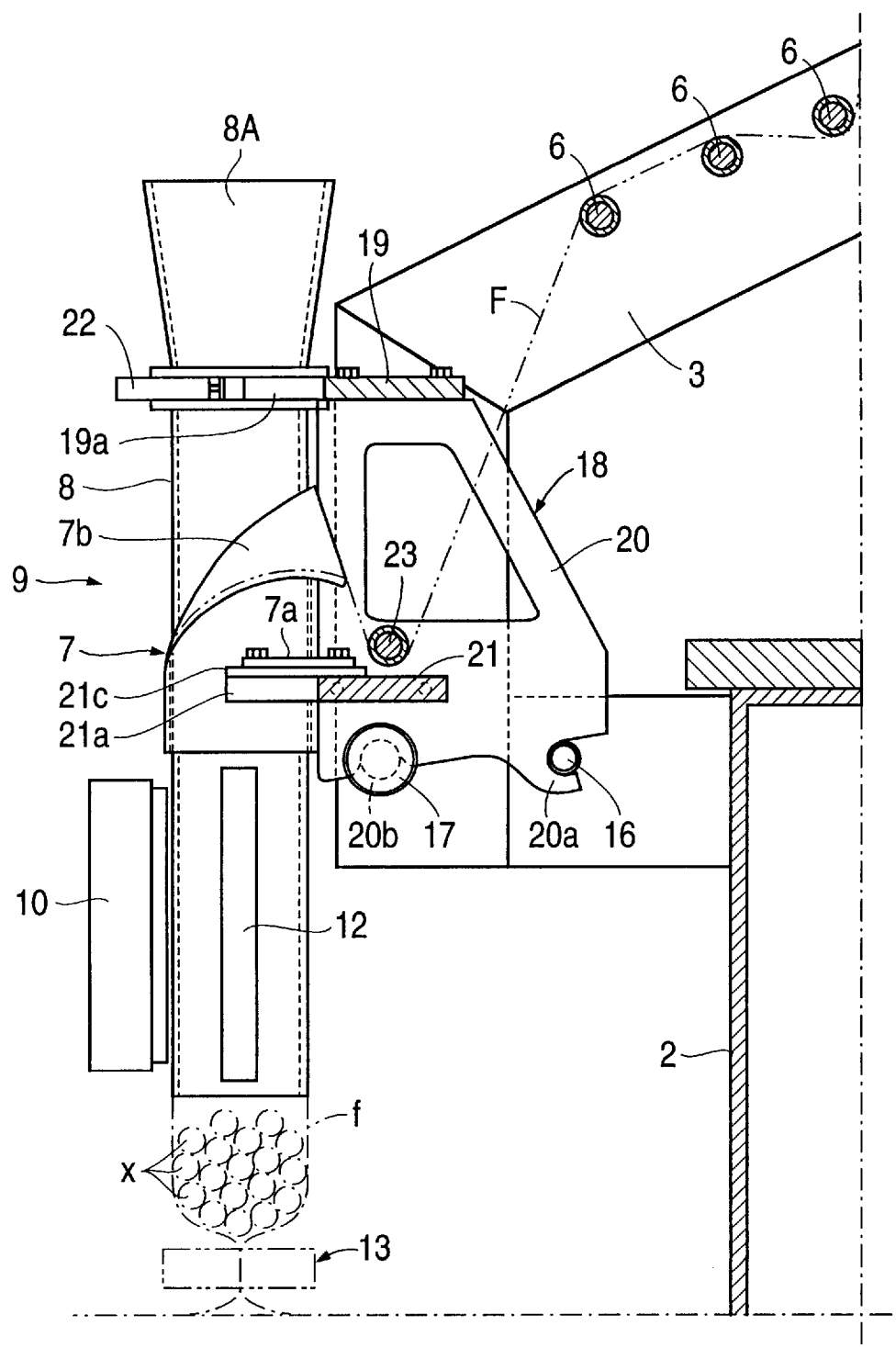
FIG. 3 is a longitudinal sectional view taken along a line 3—3 in FIG. 2.
Figure 4:
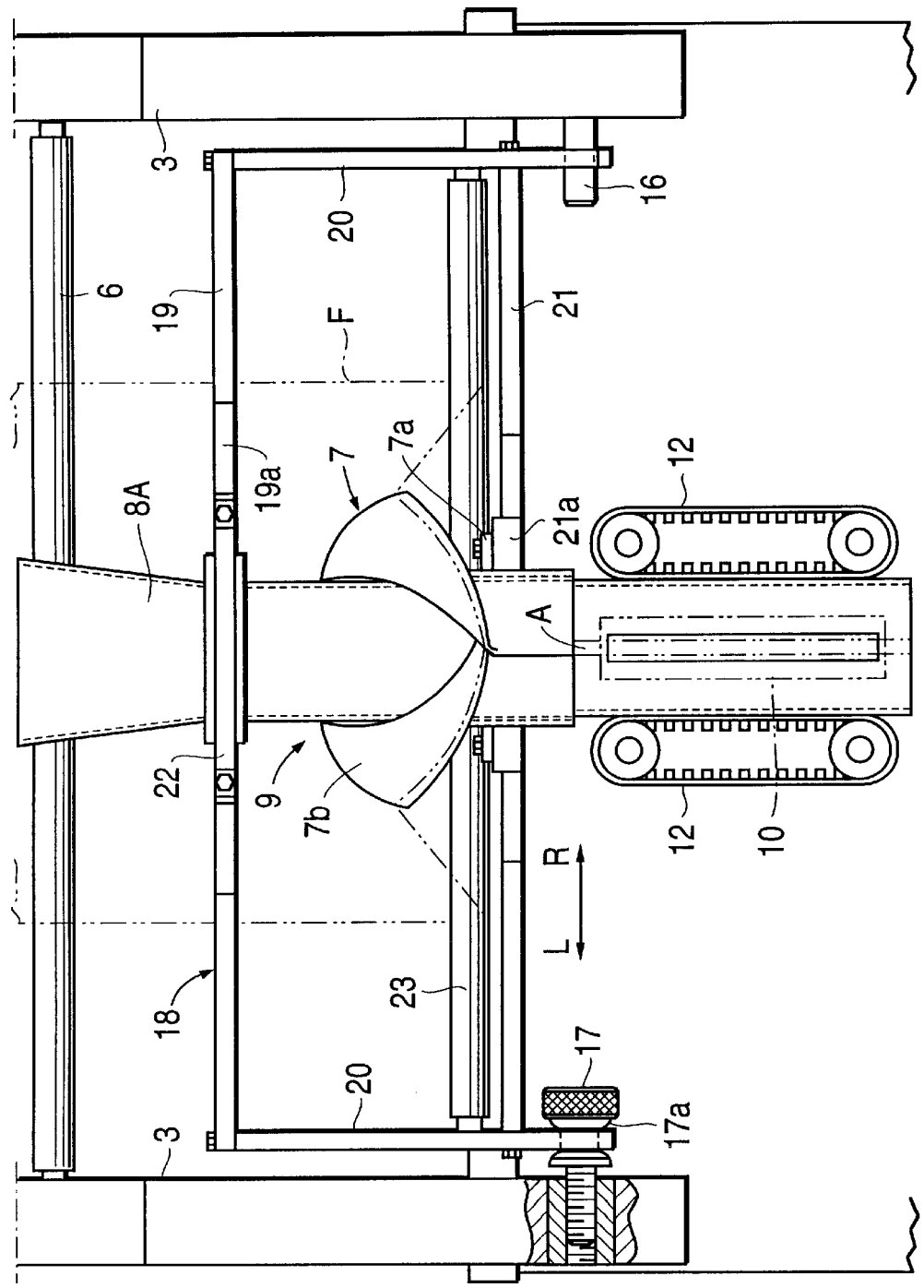
FIG. 4 is an enlarged front view showing the film former.

Furthermore, as shown by FIG. 3 or FIG. 4, transfer belts 12, for transferring a cylindrical film f in the downward direction while adsorbing it, for example, by vacuum or under friction, are installed on opposite sides of the cylindrical chute 8.

A transverse sealing device 13, for sealing in the transverse direction the cylindrical film f which has been transferred in the downward direction from the chute 8, incorporates a cutter device separating a preceding portion of the cylindrical film f at the center position of the sealed portion from a succeeding portion thereof. The transverse sealing device is installed at the bottom side of the cylindrical chute 8. Further, as shown in FIG. 3 in succession to the vertical sealing of the cylindrical film f by the transverse sealing device 13, commodities X are supplied through a funnel shaped hopper 8A mounted on the cylindrical chute 8 from which they pass into the bag. Successively, the vertical sealing and cutting are carried out while the cylindrical film f is being transferred in the downward direction and the packaging bags are discharged.

A connecting apparatus 14, that is referred to as a splicer, for connecting a newly charged film to a preceding film in the interchanging operation of the film roll R, etc., is installed at the rear portion of the frame 3 and a printing device 15 for printing predetermined information, such as a manufacturing date etc., on the film F that is transferred along the frame 3, is installed at the upper portion of the main body 2. A detailed explanation of these components will be omitted.

Figure 2:
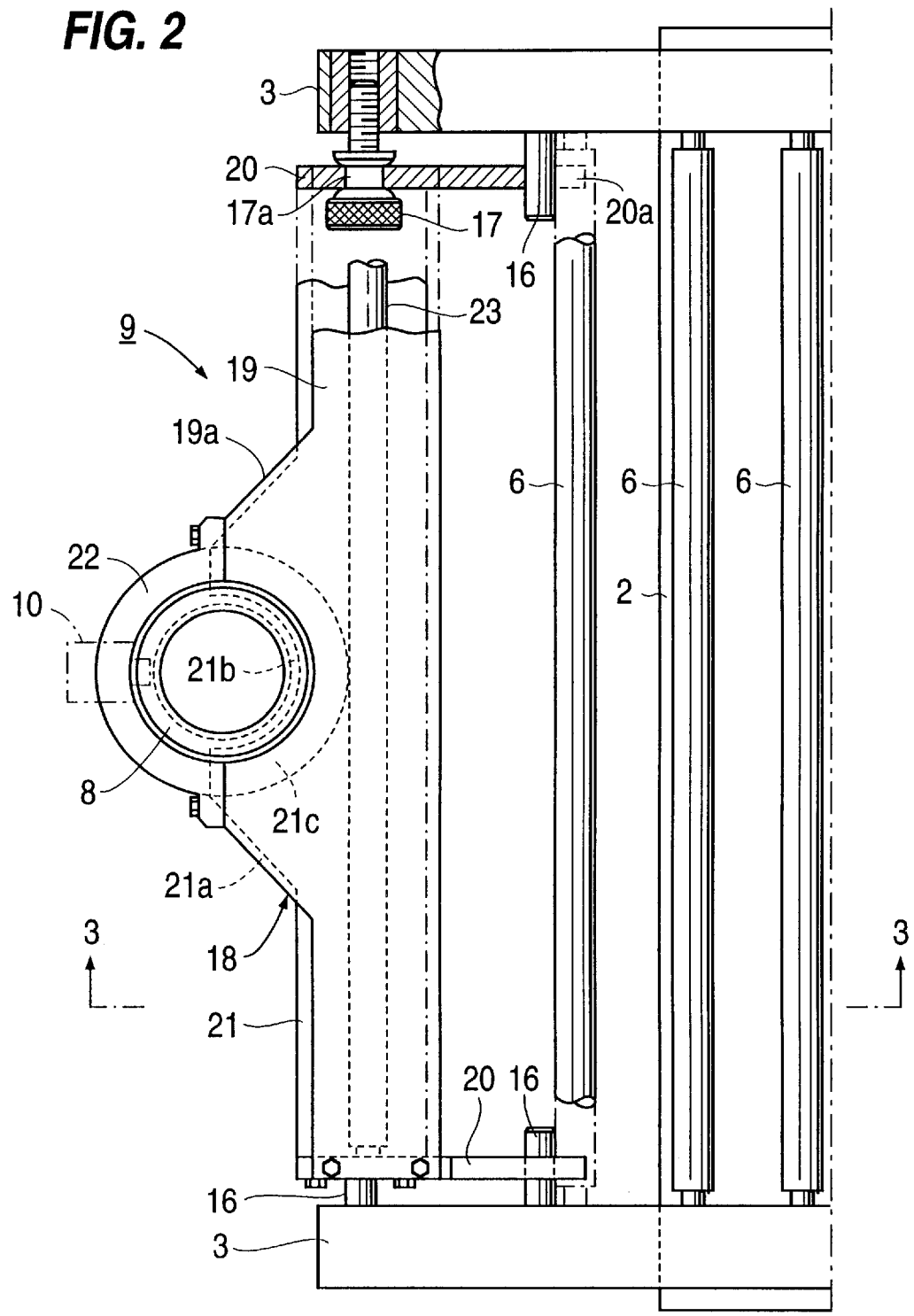
FIG. 2 is an enlarged plan view, partly in section, showing a film former in the form-fill-seal packaging machine of FIG. 1.

Next, a more detailed explanation will be given of the tube forming device 9. As illustrated in FIGS. 2–4, the front end portions of the frame 3 are bent and fixed to the side of the main body 2. Two engaging pins 16 are provided on the inner face of one frame 3. One engaging pin 16 and an adjusting screw 17 that is screwed to the frame 3, are installed on the inner face of the other one of the frames 3, protruding at substantially the same height location.

A support unit 18 supporting the former 7 and the cylindrical chute 8 is provided between the frames 3 via these engaging pins 16 and the adjusting screw 17. That is, the support unit 18 is provided with an upper side top plate 19 at the front portion of which an expanded portion 19a is formed. Vertical walls 20 fixed to the two side end portions of the top plate 19 respectively hang down therefrom and a lower side bottom plate 21 is installed to span between the vertical walls 20 in parallel with the top plate 19. At the front portion of top plate 19, an expanded portion 21a is formed similar to the top plate 19. The support unit 18 is attachably and detachably supported between the frames 3 at the front side of the main body 2 by engaging recess portions 20b, which are provided at the front lower portions of the respective vertical walls 20 respectively with the engaging pin 16 and the adjusting screw 17 from above in a state where hook portions 20a provided at the rear lower portions of the respective vertical walls 20 are vertically engaged respectively with the engaging pins 16. In that case a groove 17a for engagement is formed at a head portion of the adjusting screw 17 in its peripheral direction. The recess portion 20b of one of the vertical walls 20 is engaged with the groove 17a.

A semi-circular recess portion is formed at the expanded portion 19a of the above-mentioned top plate 19. The cylindrical chute 8 is attached to the substantially central portion in the transverse direction of the support unit 18 by means of the recess portion and a pinching member 22 having a half-ring shape. In addition thereto, a recess portion 21b having a semi-circular shape is also provided to the expanded portion 21a of the bottom plate 21. The forming unit 7 is attached to a stepped portion 21c that is formed at the peripheral portion of the recess portion 21b via an attaching flange 7a thereof, substantially similar at the central portion in the transverse direction of the support unit 18, such that the forming unit 7 surrounds the chute 8 with a predetermined small gap.

Further, an introducing roller 23 to introduce the film F is provided to span between the vertical walls 20 at the rear side of the forming unit 7. The strip-like film F which has been transferred along the frame 3, is introduced to a sailer portion 7b of the forming unit 7 via the introducing roller 23. Thereafter, the strip-like film F is drawn into the gap between the forming unit 7 and the chute 8 and is made to wrap around the peripheral face of the chute 8. The two side edge portions of the film F are made to overlap each other in fin sealing arrangement extending in the transfer direction at the front portion of the chute 8 opposite to the vertical sealing device 10.

Next, an explanation will be given of the operation of the form-fill-seal packaging machine 1. As illustrated in FIG. 4, according to the tube forming device 9, the strip-like film F is subjected to the operation of fin sealing at the center position. At this moment the film overlapping portion A is disposed at the central portion in the transverse direction of the chute 8. Corresponding thereto, the vertical sealing device 10 is arranged to oppose the central portion in the transverse direction of the chute 8. Now, the tube forming device 9 is interchanged to a device whereby the fin sealing is performed at an offset portion. In that case, as illustrated in FIG. 5, a forming unit 7' and a chute 8' for the offset operation which have been interchanged, are arranged at positions of the forming unit 7 and the chute 8 which are the same as those in the previous centering operation.

Figure 5:
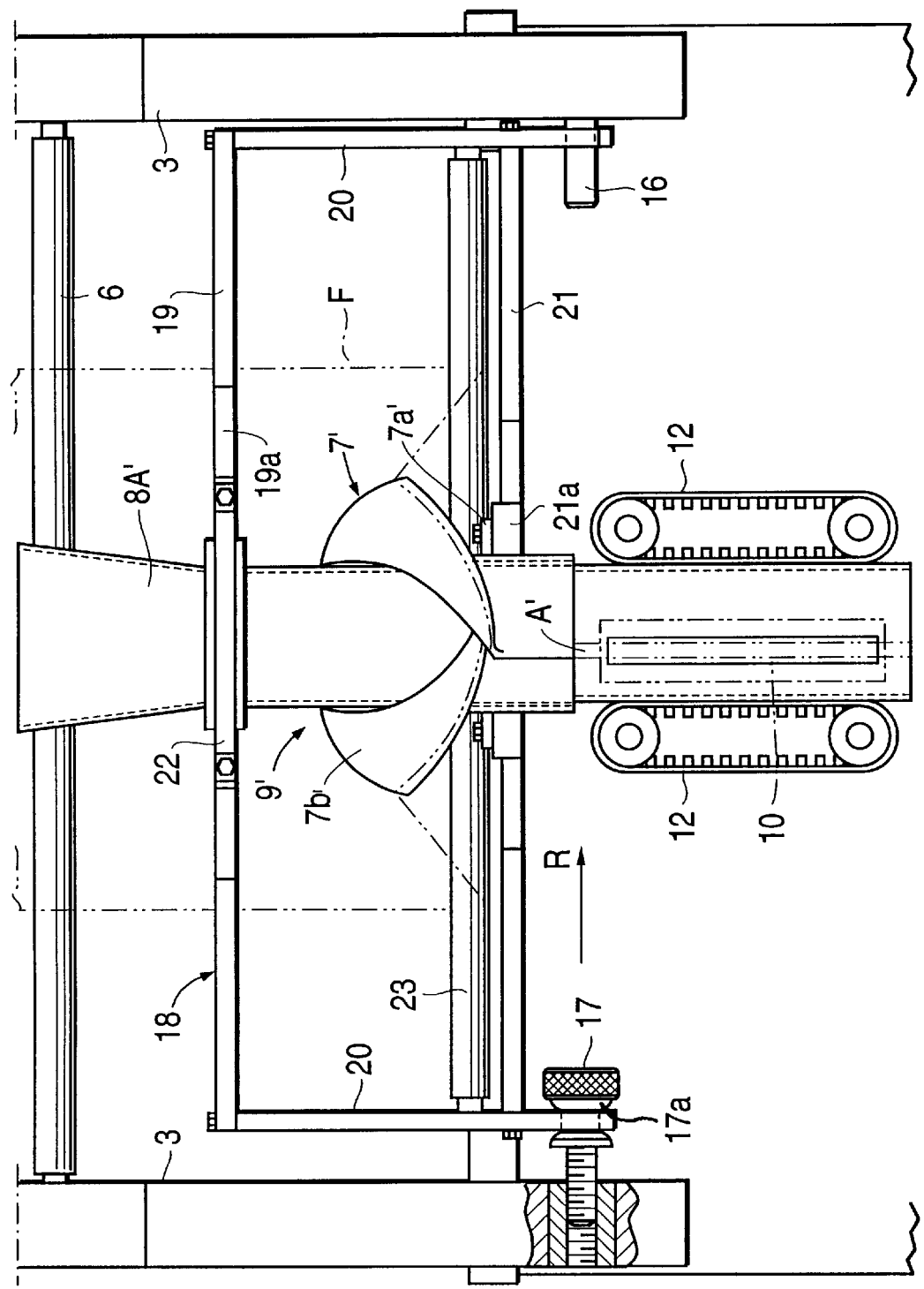
FIG. 5 is an explanatory view explaining the operation of the form-fill-seal packaging machine according to the present invention.
Figure 6:
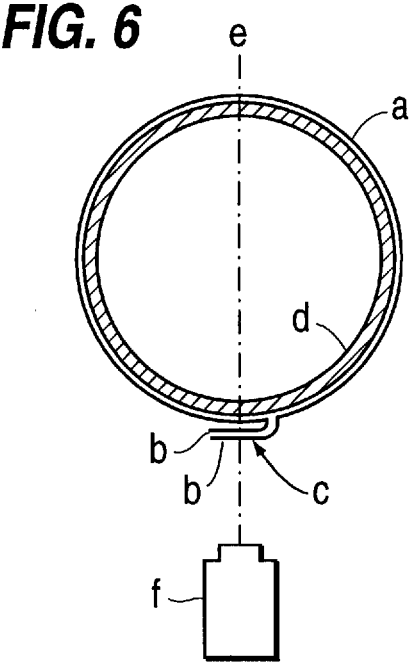
FIG. 6 is an explanatory view showing a mode of vertical sealing in the case of centered "fin sealing" in a known machine.
Figure 7:
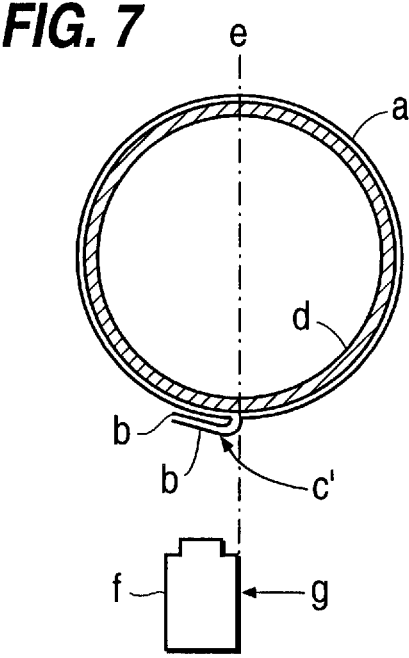
FIG. 7 is an explanatory view showing a mode of vertical sealing in the case of an offset center thereof.

However, in the case shown in FIG. 5, the film overlapping portion A' is offset from the central portion of the chute 8' in either the left or right direction. Therefore, in this state the positional relationship between the film overlapping portion A' and the vertical sealing device 10 is transversely shifted whereby the proper vertical sealing cannot be carried out.

Since the support unit 18 supporting the forming unit 7 and the cylindrical chute 8, is supported between the frames 3 in a state where it is engaged with the engaging pins 16 and the adjusting screw 17, the whole support unit 18 can be horizontally moved in the transverse direction as illustrated by arrow marks L and R of FIG. 4 by rotating the adjusting screw 17 via the engagement between the adjusting screw 17 and the recess portion 20b of one of the vertical walls 20. In this manner, it is possible to bring the position of the cylindrical chute 8' or the offset film overlapping portion A' into alignment with the vertical sealing device 10. Incidentally, FIG. 5 exemplifies the case where the support unit 18 or the tube forming device 9' is transversely moved in the R direction.

As described above, the present invention is provided with the constitution in which the tube forming device 9, which facilitates the attachment and detachment in respect of the main body frames 3, is transversely moved. Therefore, the tube forming device 9 is compared with the case in which the vertical sealing device 10 having a structure whereby it can be escaped via the support arm 11, is provided with an adjusting mechanism. Thus, the present invention can be provided with a more simple constitution.

Furthermore, although with the conventional vertical sealing device it is difficult optically to determine the amount of movement when it is moved in the transverse direction, according to this form-fill-seal packaging machine 1, the side of the chute 8 is transversely moved and therefore, the amount of movement from an initial reference position can optically be recognized simply. Further, when the position of the film overlapping portion A' that is overlapped by the forming unit 7, or the amount of the offset is known, the vertical sealing device 10 and the film overlapping portion A' can be brought into alignment with each other easily without conducting a trial operation.

In summary, the side of the tube forming device 9 comprising the forming unit 7 and the chute 8 is made to move in the transverse direction with respect to the vertical sealing device whereby the positioning between the film overlapping portion and the vertical sealing device that is accompanied by the interchange of the mode of vertical sealing, can be performed easily without excessively complicating the support mechanism of the vertical sealing device.

A further advantage of the invention is that it enables the position of the forming unit to track relative to the sealing device during operation so as to maintain alignment of the portion to be sealed with the sealing device. This is particularly important with fin seals, where relatively narrow regions must be sealed and accurate alignment with the sealing device is important.

What is claimed is:

1. A form-fill-seal packaging machine comprising:

means for forming an elongate film into a tubular shape around a cylindrical chute; and means for sealing longitudinal edges of said film to complete the formation of a tubular film, wherein said forming means is mounted for movement relative to the sealing means in a direction orthogonal to the direction of movement of the film.

2. A machine according to claim 1, further comprising a chute for supplying commodities into bags formed from the film, the chute extending into the forming means.

3. A machine according to claim 1, wherein the forming means is supported on a carriage mounted to a frame by means for adjusting, said adjusting means being operable to move the carriage relative to the frame so as to cause the movement of the forming means.

4. A machine according to claim 2, wherein the forming means is supported on a carriage mounted to a frame by means for adjusting, said adjusting means being operable to move the carriage relative to the frame so as to cause the movement of the forming means.

5. A form-fill seal packaging machine comprising:

a forming unit to form an elongate film into a tubular shape around a cylindrical chute; and a sealing unit to seal longitudinal edges of said film to complete the formation of tubular film, wherein said forming unit is mounted so as to be moveable relative to the sealing unit in a direction orthogonal to the direction of movement of the film.

6. A machine according to claim 5, further comprising an adjusting unit, wherein the forming unit is supported on a carriage mounted to a frame by said adjusting unit, said adjusting unit being operable to move the carriage relative to the frame so as to cause the movement of the forming unit.

7. A machine according to claim 5, further comprising a chute for supplying commodities into bags formed from the film, the chute extending into the forming unit.

\* \* \* \* \*